US008120581B2

(12) United States Patent
Day et al.

(10) Patent No.: US 8,120,581 B2
(45) Date of Patent: Feb. 21, 2012

(54) INTEGRATED CONTROL SYSTEM WITH KEYBOARD VIDEO MOUSE (KVM)

(75) Inventors: Don Day, Oakland, CA (US); Konstantin Timokhin, Walnut Creek, CA (US)

(73) Assignee: RGB Spectrum, Alameda, CA (US)

( * ) Notice: Subject to any disclaimer, the term of this patent is extended or adjusted under 35 U.S.C. 154(b) by 673 days.

(21) Appl. No.: 12/133,254

(22) Filed: Jun. 4, 2008

(65) Prior Publication Data

US 2009/0080856 A1 Mar. 26, 2009

Related U.S. Application Data (63) Continuation of application No. 11/858,720, filed on Sep. 20, 2007.

(51) Int. Cl.
*G06F 3/033* (2006.01)
(52) U.S. Cl. ..................................................... 345/163
(58) Field of Classification Search .................. 345/156, 345/163–172
See application file for complete search history.

(56) References Cited

U.S. PATENT DOCUMENTS

| 2002/0116539 | A1* | 8/2002 | Bryczkowski et al. | 709/317 |
| 2006/0117106 | A1* | 6/2006 | Abdo et al. | 709/227 |
| 2007/0022176 | A1 | 1/2007 | Kobayashi et al. | |
| 2007/0115992 | A1 | 5/2007 | Weinstock et al. | |
| 2007/0272734 | A1* | 11/2007 | Lipton et al. | 235/375 |
| 2008/0005414 | A1* | 1/2008 | Liu et al. | 710/62 |
| 2008/0064933 | A1* | 3/2008 | Garibaldi et al. | 600/300 |

OTHER PUBLICATIONS

U.S. Appl. No. 11/858,720 titled, "Integrated Control System With Keyboard Video Mouse (KVM)," filed Sep. 20, 2007, 2006.
PCT Application No. PCT/US 08/76736 titled "Integrated Control System With Keyboard Video Mouse (KVM)," filed Sep. 17, 2008.
PCT Notification of Transmittal of the International Search Report and the Written Opinion of the International Searching Authority, Application No. PCT/US 08/76736 dated Nov. 21, 2008.
Office Action mailed Jun. 28, 2010 for U.S. Appl. No. 11/858,720.
Final Office Action mailed Dec. 28, 2010 for U.S. Appl. No. 11/858,720.
Office Action mailed Apr. 29, 2011 regarding U.S. Appl. No. 11/858,720.
Final Office Action mailed Aug. 31, 2011 regarding U.S. Appl. No. 11/858,720.

* cited by examiner

*Primary Examiner* — Richard Hjerpe
*Assistant Examiner* — Jeffrey A Parker
(74) *Attorney, Agent, or Firm* — Kwan Intellectual Property Law (57) ABSTRACT Methods and apparatus are provided for efficiently controlling source computers connected to a display system. A control computer, source computers, and a video processor are connected over a control network. Input signals such as keyboard and mouse input signals are provided to the video processor and the source computers through the control network. The source computers are also connected to the video processor through a video interface, such as multiple Digital Video Interface (DVI) lines. The use of a hybrid system allows flexibility in configuring and using the control network while providing high throughput and low latency for video sent to the video processor.

24 Claims, 6 Drawing Sheets

INTEGRATED CONTROL SYSTEM WITH KEYBOARD VIDEO MOUSE (KVM)

CROSS-REFERENCE TO RELATED APPLICATIONS

The present application is a continuation of and claims priority to co-pending U.S. patent application Ser. No. 11/858,720, filed Sep. 20, 2007, which is incorporated herein by reference in its entirety.

DESCRIPTION OF RELATED ART

The present disclosure relates to integrated control systems. In some examples, the techniques of the present disclosure provide mechanisms for efficiently managing source computers.

A video processor presents the video input from the multiple source computers and other video sources on or across one or more displays. Placement of windows allows juxtaposition of related information, positioning and scaling.

However, conventional systems provide somewhat limited mechanisms for controlling the source images. Consequently, the techniques of the present invention provide improved mechanisms for control of source computers connected to a video processor such as a single-screen multiviewer or video wall controller attached to a display system.

OVERVIEW

Methods and apparatus are provided for efficiently controlling source computers connected to a display system. A control computer, source computers, and a video processor are connected over a control network. Input signals such as keyboard and mouse input signals are provided to the video processor and the source computers through the control network. The source computers are also connected to the video processor through a video interface, such as multiple Digital Video Interface (DVI) lines. The use of a hybrid system allows flexibility in configuring and using the control network while providing high throughput and low latency for video sent to the video processor.

These and other features of the present invention will be presented in more detail in the following specification of the invention and the accompanying figures, which illustrate by way of example the principles of the invention.

BRIEF DESCRIPTION OF THE DRAWINGS

The disclosure may best be understood by reference to the following description taken in conjunction with the accompanying drawings, which illustrate particular embodiments of the present invention.

DESCRIPTION OF PARTICULAR EMBODIMENTS

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of particular interfaces and networks. However, it should be noted that the techniques and mechanisms of the present invention can be used with a variety of interfaces and networks. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a processor is used in a variety of contexts. However, it will be appreciated that multiple processors can also be used while remaining within the scope of the present invention unless otherwise noted. Furthermore, the techniques and mechanisms of the present invention will sometimes describe two entities as being connected. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Many display systems such as multiviewer and video wall systems receive video from a variety of sources. In many instances, these sources are computer systems each with their own processors, memory, storage, input interfaces, and output interfaces. According to particular embodiments, source computers include computing devices and keyboard and mouse-controlled video sources. Examples of keyboard and mouse-controlled video sources include pan-tilt-zoom (PTZ) cameras, digital video recorders (DVR), etc. A video processor allows images from the various source computers, and controlled video sources such as cameras and recorders, to be manipulated to provide a customized display of information on one or more display devices. In many instances, the source computers are controlled individually by users situated at the source computers through keyboard and mouse input.

The techniques of the present invention recognize that the control of the individual source computers remains disjointed. Consequently, a control computer is provided to configure and manipulate individual source computers. According to various embodiments, the control computer is connected to the various source computers through a control network. Discrete input interfaces such as keyboards and keypads and pointing interfaces such as mice, touchpads, touchscreens, trackballs, tablets and multi-touch surfaces, no longer need to be provided with individual source computers. In some examples, a single keyboard and mouse at a control computer can be used to manipulate numerous source computers. In the case of multi-touch surfaces two or more manipulations may occur simultaneously.

The techniques of the present invention also recognize that video provided over a control network often has poor quality. Consequently, additional agent software is provided on source computers to allow use of a hybrid network, where video input provided over video interfaces is synchronized with control signals provided over a control network. A control computer can manipulate windows and video from various source computers and controlled video sources shown in a multiviewer or video wall by sending control signals over a control network. Video signals are sent over video interfaces from source computers and controlled video sources to a video processor connected to a display system. In some examples, a video processor is a wall processor or a limited processor such as a switcher. A hybrid network using a combination of direct video connections and a control network provides high bandwidth throughput for video and flexible data transfers for keyboard and mouse input signals. Displayed visuals are real time and synchronized with keyboard and mouse input.

Figure 1:
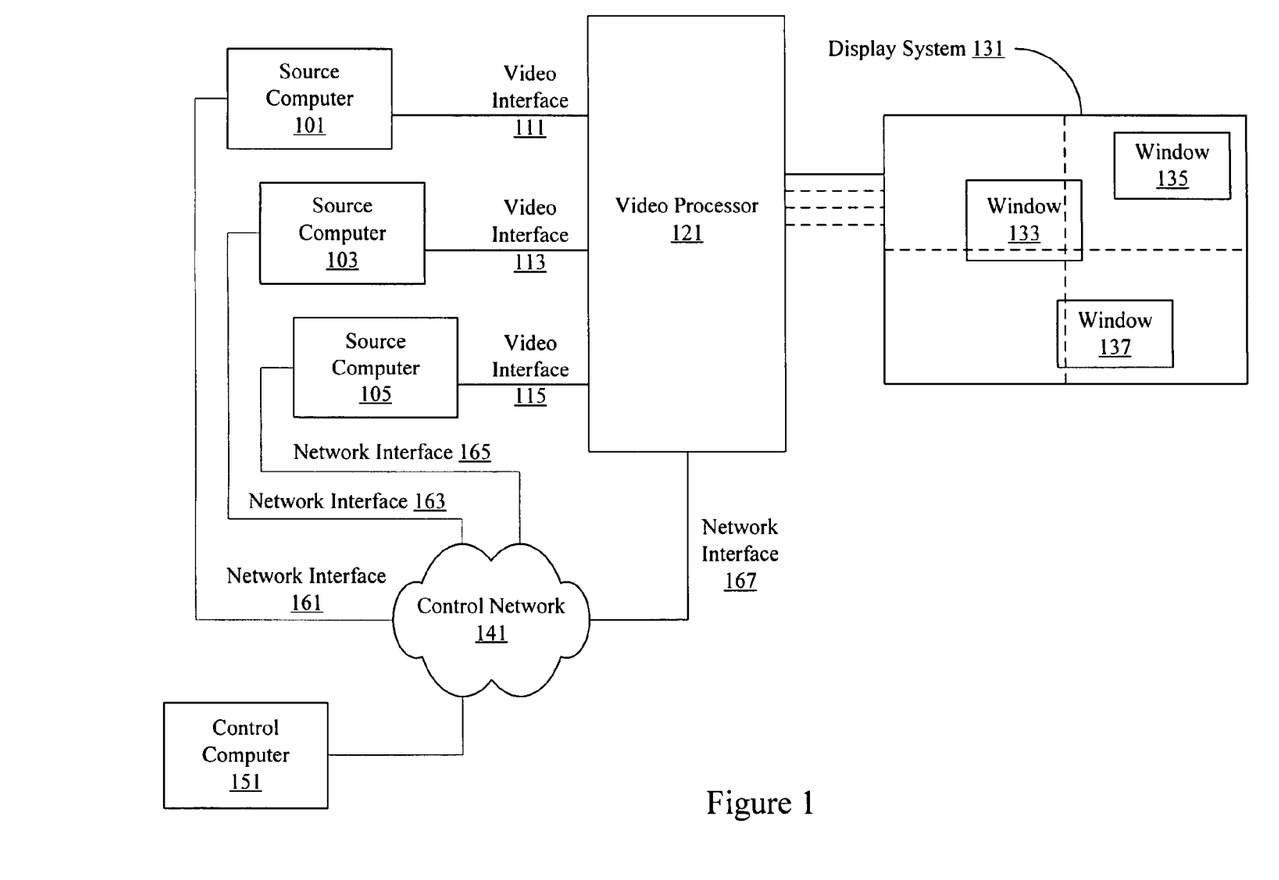
FIG. 1 is a diagrammatic representation showing an integrated control system.

FIG. 1 is a diagrammatic representation showing one example of an integrated control system with keyboard video mouse (KvM). The integrated control system with keyboard video and mouse (KvM) includes a control computer 151. According to various embodiments, the control computer 151 is a computer system that has an input interface such as a keyboard, mouse, touchpad, keypad, touchscreen, etc as well as a network interface connected to a control network 141. In particular embodiments, the control network can be one of a variety of different networks, such as Ethernet, wireless, serial, or Bluetooth™. According to various embodiments, the control network is any network that does not sufficiently support video transmission from source computers 101, 103, and 105 to a video processor 121. The control network 141 may not sufficiently support video transmission because of bandwidth or latency considerations.

According to various embodiments, the control network 141 is connected to source computers 101, 103, and 105 through network interfaces 161, 163, and 165. In particular embodiments, any device that can be manipulated using input devices such as keyboard and mice to provide to provide video is referred to herein as a source computer. According to various embodiments, a camera is manipulated using an input remote to provide video. Each source computer 101, 103, and 105 includes a processor and memory and may or may not be connected to a keyboard and a mouse. Instead of requiring input devices directly connected to each source computer, the source computers 101, 103, and 105 can be controlled by input devices connected to a control computer 151. The input device control signals can be conveyed over the control network 141 to operate individual source computers 101, 103, 105. According to various embodiments, source computers 101, 103, and 105 may simply be processing systems, or controlled video sources, without attached keyboards or monitors.

Source computers 101, 103, and 105 have video interfaces 111, 113, and 115 respectively connected to a video processor 121. According to various embodiments, the video interfaces 111, 113, and 115 are Digital Visual Interface (DVI) or High Definition Multimedia Interface (HDMI) connections. In particular embodiments, the video interfaces 111, 113, and 115 are operable to carry video from sources computers 101, 103, and 105 in a much more effective manner than a control network 141 could carry video.

The video processor 121 receives video from source computers 101, 103, and 105 over video interfaces 111, 113, and 115. It is also possible that the video processor 121 receives some video over a control network 141 as well. According to particular embodiments, the video processor performs processing that involves receiving video, performing modification to the video, and/or selecting video from the source computers 101, 103, and 105. The video processor 121 takes the video and sends the video to display system 131. Display system 131 may be a standard monitor, screen, display, projector, or combination of multiple monitors, screens, displays, and projectors. The video processor 121 also receives input signals from the control computer 151 over the control network 141 and network interface 167. According to various embodiments, the keyboard and mouse input from the control computer 151 received at the video processor 121 is used to configure and manipulate source computers 101, 103, and 105 and corresponding windows 133, 135, 137. Objects in the display system 131 and objects in windows 133, 135, and 137 can be controlled using input devices connected to the control computer 151. In particular embodiments, a control computer 151 can start a video feed from source computer 101 in window 133 by controlling the video processor 121 over the control network 141. The video feed itself may be provided over video interface 111.

According to various embodiments, the video processor is a media aggregation device such as a MediaWall® or SuperView® Processor available from RGB Spectrum of Alameda, Calif. In particular embodiments, the video processor is a specially configured system or appliance configured to receive video over video inputs and control signals over a control network. In some examples, the system is a specially configured computer system based device.

According to various embodiments, the control computer may display a plurality of labeled rectangles, or of reduced resolution windows, each associated with one of the plurality of source computers or other controlled video sources. In particular embodiments such a control computer display may be rendered as the function of a network-transmitted Java applet, such as a WCP Control Panel from RGB Spectrum of Alameda, Calif.

Communication between the control computer and source computer can be encrypted. All communications within the integrated control system with keyboard video and mouse (KvM) can be secure. According to various embodiments, the video interfaces are local and secure. The control network may be shared with other entities such as other personnel in an enterprise environment, but communications over the control network can be secured using encryption.

It should be noted that although the components of an integrated control system with keyboard video and mouse (KvM) are shown as separate entities, it will be recognized that some entities can be combined with others. For example, in some examples, a control computer 151 can be integrated with a video processor 121. In other examples, one of the source computers can also be a control computer 151. A variety of arrangements are possible as will be appreciated.

Figure 2:
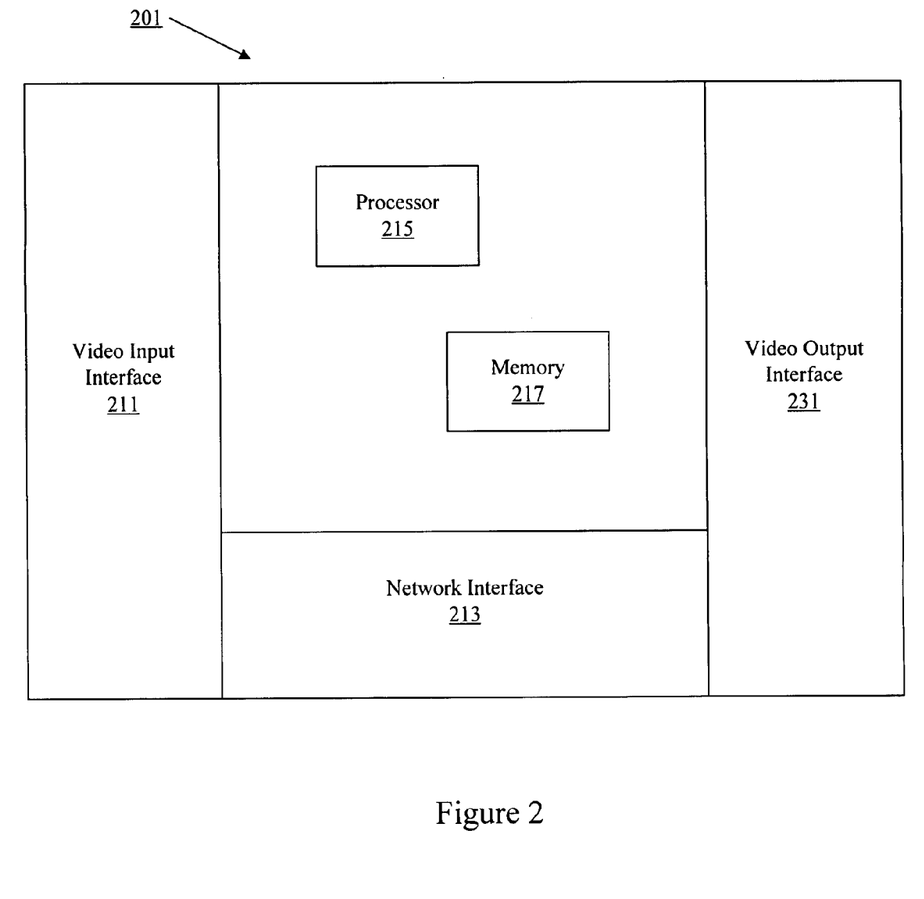
FIG. 2 is a diagrammatic representation showing a video processor.

FIG. 2 is a diagrammatic representation showing one example of a video processor. According to various embodiments, the video processor is a specially configured appliance operable to receive video input and display video output in various windows located on a display system. In particular embodiments, the video processor is a media aggregation device such as a MediaWall® or SuperView® Processor available from RGB Spectrum of Alameda, Calif. In other particular embodiments, the video processor is a computer system, server, board, device or chip. According to various embodiments, video processor 201 includes a processor 215, memory 217, network interface 213, video input interface 211, and video output interface 211.

In particular embodiments, the video input interface 211 is a collection of Digital Video Interfaces (DVI) that receives video over video connections from source computers or source video sources. Video output interface 231 sends video output over one or more lines to a display system. The video output interface 231 may also be a collection of Digital Video Interfaces (DVI). Other types of interfaces such as High Definition Multimedia Interface (HDMI) can also be used. Network interface 213 receives keyboard and mouse signals from a control computer. According to various embodiments, the network interface 213 is an enterprise network used by a variety of computers outside of the integrated control system with keyboard video and mouse (KvM). The network interface 213 may connect the video processor 201 to an IP network, wireless network, etc. According to various embodiments, the network interface 213 can be used for any type of data from source and control computers including input signals and video signals. However, because it is difficult to transport video over a control network such as an Ethernet network, video from source computers is sometimes directly transmitted over dedicated lines to the video processor.

According to various embodiments, the video processor is a real time video/data wall processor that supports a display system, including one or more projectors, cubes, monitors, or displays. Any single display or multiple display grouping showing video data from multiple computers systems is referred to herein as a display system. According to various embodiments, the video processor works with any tiled display, and has adjustments to compensate for the bezel between panels or cubes, as well as overlapped outputs to support edge blending on a continuous screen. In particular embodiments, the video processor can provide multiple graphics and video windows on multiple screens. For examples, eight graphics and eight video signals can be displayed in sixteen windows over six screens. Some examples of video graphics signals include Red Green Blue (RGB), Digital Video Interface (DVI), and High Definition Television (HDTV). In particular embodiments, video inputs may be composite, component, or S-Video.

Figure 3:
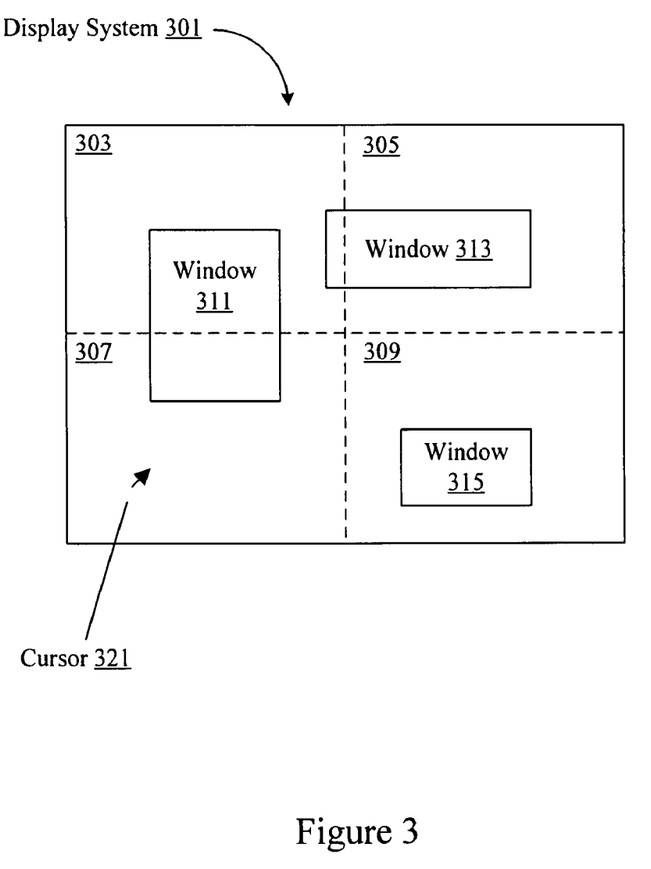
FIG. 3 is a diagrammatic representation showing a display system.

FIG. 3 is a diagrammatic representation showing one example of a display system 301. According to various embodiments, the display 301 includes monitors 303, 305, 307, and 309. In particular embodiments, the display system 301 may include one, two, four, six, or sixteen tiled displays. The display system 301 is connected to a video processor through one or more video lines. In particular embodiments, each video line is connected to a corresponding display 303, 305, 307, or 309. According to various embodiments, the display system 301 includes a cursor 321 associated with a control computer. The windows 311, 313, and 315 are associated with source computers. Each source computer may correspond to a particular window. In particular embodiments, a source computer can spawn multiple windows.

Any video including images and data in windows 311, 313, and 315 may be provided over direct video connections, or over a sufficiently high-speed network. Control information such as cursor control may be provided over a control network. Video quality including resolution, response times, frame rates, for display output from source computers is superior to video transmitted over a control network such as an Ethernet network. However, flexibility in configuration is maintained by also using a control network such as an Ethernet network. A control network typically is more flexible. For example, it may carry a wider variety of data, may have more two way transmission capabilities, may allow greater distances between connected nodes, etc. Furthermore, a control network such as an enterprise local area network may already be setup and would be relatively easy to use. Source and control computers could be connected to the control network relatively easily. By using both a video interface and a control network, a hybrid solution is provided that allows for benefits of both types of networks. Although some added complexity may result, a video interface allows high quality video transport while a control network allows flexible configuration options. Another possible hybrid solution uses a high-speed network, such as Gigabit Ethernet, for video, and a slower wireless network, such as Bluetooth, for control.

Images can be displayed anywhere, any size, within or across screens, in a corresponding aspect ratio or stretched to fit, in whole or zoomed to emphasize details. Background images, up to the aggregate resolution of the display system, can be loaded over the network or loaded from local storage. In some examples, control is offered over serial or Ethernet ports. In particular embodiments, a web browser based control system provides both local and remote operation.

Figure 4:
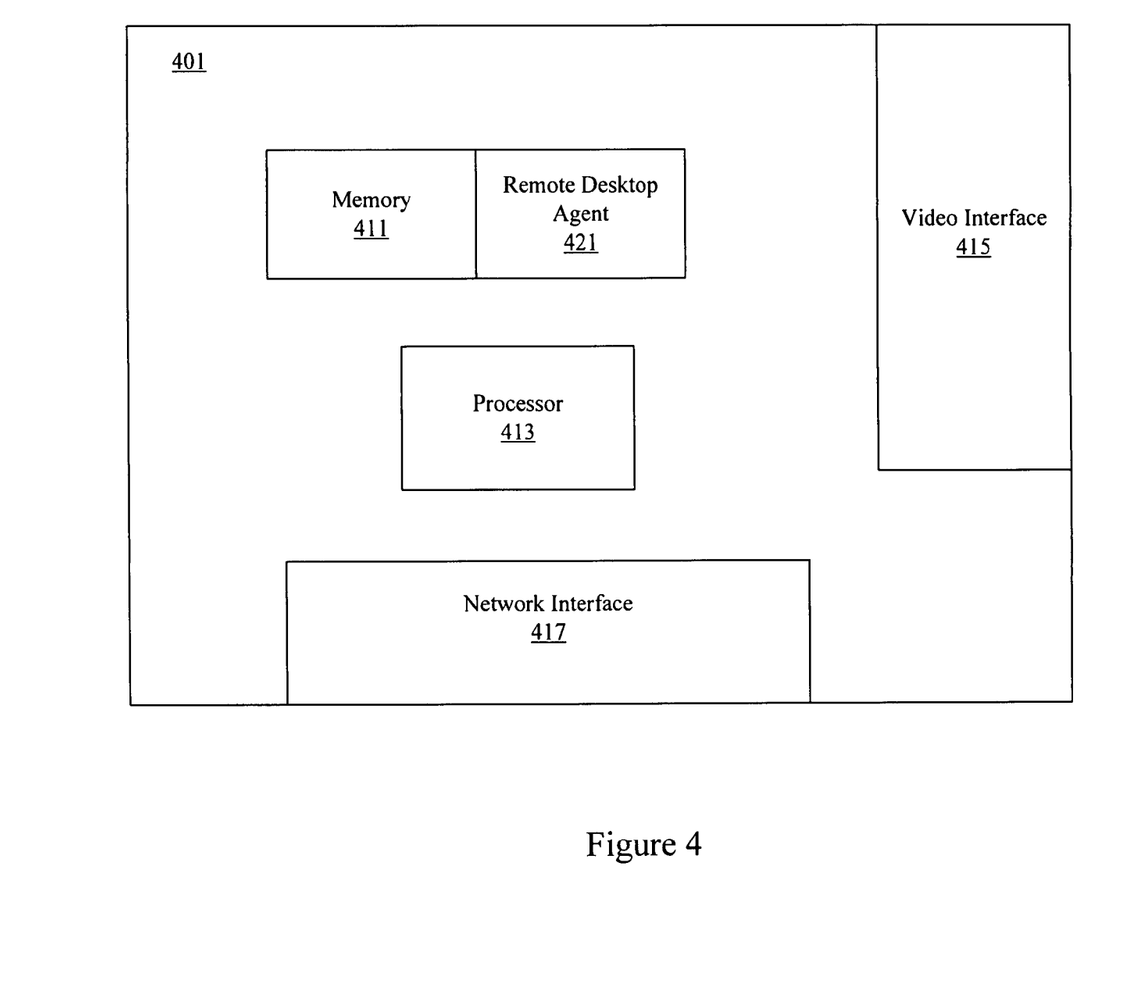
FIG. 4 is a diagrammatic representation showing a source computer.

FIG. 4 is a diagrammatic representation showing one example of a source computer. Any device providing video including data, images, live feeds, etc is referred to herein as a source computer. According to various embodiments, a source computer 401 includes a processor 413 and a memory 411. The source computer also includes a network interface 417 and a video interface 415. In particular embodiments, a remote desktop agent 421 is installed on a source computer. In some examples, the remote desktop agent 421 is an application installed on a conventional computer system to allow a control computer to interface with the source computer through the network interface 417. The source computer 401 may or may not have its own input devices, as input devices connected to a control computer can be used to configure and control the source computer. In some examples, the remote desktop agent 421 is configured to communicate with a control computer over the control network using the network interface 417 and send video to a video processor over the video interface 415. In particular embodiments, it is also possible that the remote desktop agent 421 sends video using the network interface 417. In particular embodiments, it is also possible that the remote desktop agent sends control over one network and video data over a different, higher capacity network.

Because the network interface 417 may be connected to a shared network, source computer 401 is typically also configured to support security. In particular embodiments, enterprise networks and particularly enterprise wireless networks provide many access points that can not distinguish between authorized and unauthorized users. An unauthorized user could snoop packets transmitted between control and source computers. This is problematic in many applications of an integrated control system with keyboard video and mouse (KvM).

According to various embodiments, public-key private-key encryption is used between a source computer and a control computer to create a secure session. In other examples, shared secret keys may be known and configured at both the source computer and the control computer. Mechanisms such as Transport Layer Security (TLS) and Secure Sockets Layer (SSL) and Secure Shell (SSH) can be used to provide security between the control computer and the source computers. A portion of communications or all communications can be encrypted and authenticated. In some embodiments, the entire control network can be secured.

Video transmission interfaces typically do not require additional software or hardware based security, as physical security can typically be provided between source computers and the video processor. However, it is possible that in some instances, video transmission between the source computers and the video processor may also be secured. Examples of source computers include computer systems, video databases, digital cameras, or any device that can send video data to a video processor and receive input signals over a control network.

Figure 5:
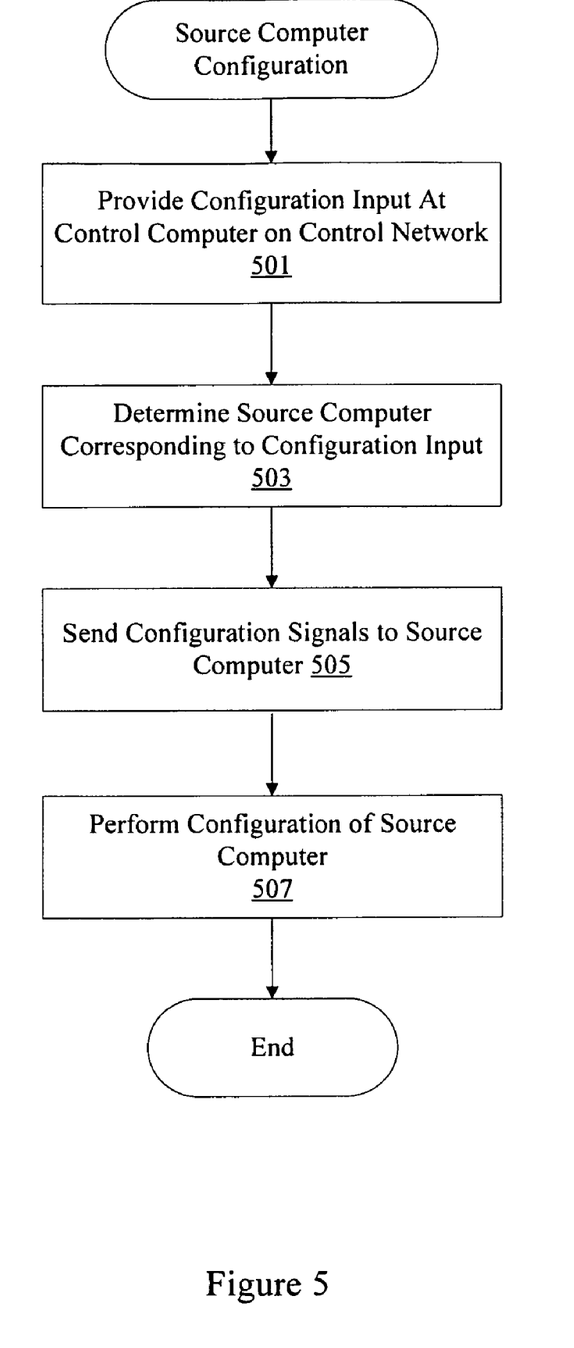
FIG. 5 is a process flow diagram showing a technique for receiving input at a video processor.

FIG. 5 is a flow process diagram showing one technique for configuring a source computer. At 501, configuration input is provided at a control computer on a control network. Configuration input may be entered using a variety of input devices. At 503, the source computer corresponding to the configuration input is determined. In some instances, the source computer may be selected by a user at a control computer viewing windows on a display wall. At 505, configurations signals are sent to the source computer. The configuration signals may take the form of mouse movements or keyboard key presses translated into IP packets. At 507, configuration of a source computer is performed upon receiving the packets.

Although configuration of a source computer can be performed from a control computer, it is also possible that a source computer may also have input devices that allow configuration. For example, some source computers may also be connected to input devices such as touchpads, keyboards, keypads, microphones, etc. Some source computers may also have their own output devices such as monitors, displays, speakers, etc.

Figure 6:
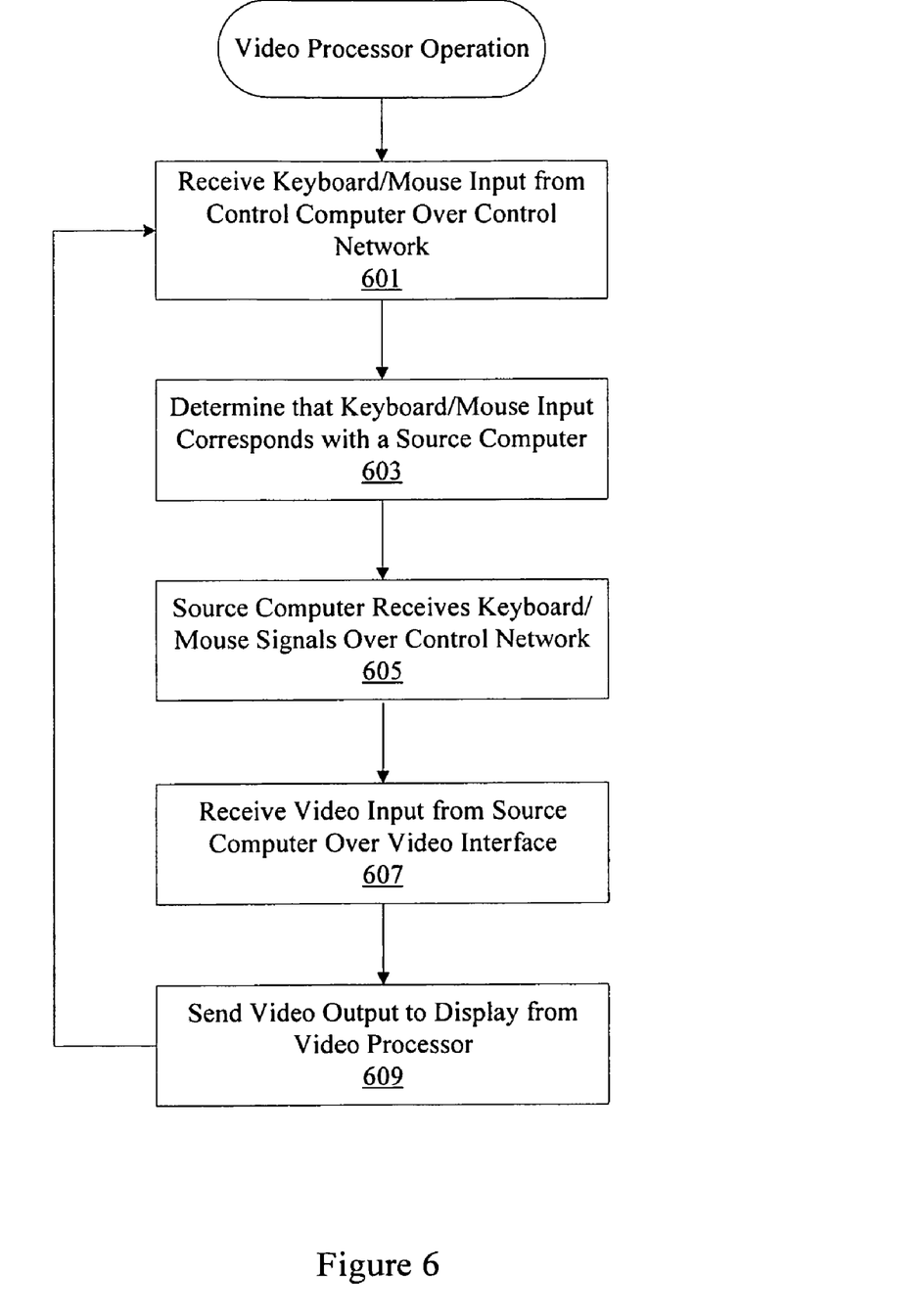
FIG. 6 is a process flow diagram showing a technique for handling input and output at a source computer.

FIG. 6 is a flow process diagram showing video processor operation. At 601, the video processor receives keyboard and mouse input from a control computer over a control network. At 603, it is determined that the keyboard and mouse input corresponds with a particular source computer. Alternatively, it may be determined that the keyboard and mouse input from the control computer should be associated with control computer operations. At 605, the source computer receives keyboard and mouse input from the control computer over the control network. According to various embodiments, the input signals can be from a variety of sources including the control computer, the video processor, or even input devices connected to the source computer. At 607, the video processor receives video input from the source computer over the video interface. The video interface allows high quality transmission of video including data and imagery. At 609, the video output is sent to the display wall from the video processor.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of primary and secondary components and should not be restricted to the ones mentioned above. It is therefore intended that the invention be interpreted to include all variations and equivalents that fall within the true spirit and scope of the present invention.

Because such information and program instructions may be employed to implement the systems/methods described herein, the present invention relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A system, comprising:
    a plurality of video signal sources including a pan-tilt-zoom (PTZ) camera;
    a video processor connected to the plurality of video signal sources, the video processor operable to process video input from the plurality of video signal sources transmitted over dedicated lines;
    a control computer connected to the plurality of video signal sources and the video processor, wherein the video processor and the plurality of video signal sources are operable to receive input device signals from the control computer, wherein control of the plurality of video signal sources is associated with input device signals provided over a control network;
    a display system connected to the video processor, wherein the video processor transmits video output to the display system and wherein video input from the plurality of video signal sources is synchronized with input device signals from the control computer provided over the control network.

2. The system of claim 1, where the plurality of video signal sources are a plurality of source computers operable to receive input device signals from the control computer, wherein the plurality of source computers are configured to generate video outputs.

3. The system of claim 1, wherein input device signals comprise keyboard input signals.

4. The system of claim 1, wherein input device signals comprise mouse input signals.

5. The system of claim 1, wherein input device signals comprise touchpad input signals.

6. The system of claim 1, wherein the network is a wireless network.

7. The system of claim 1, wherein the network is an Internet Protocol (IP) network.

8. The system of claim 1, wherein the video processor is included in the control computer.

9. The system of claim 7, wherein each of the plurality of video signal sources, the control computer, and the video processor are assigned unique IP addresses.

10. The system of claim 2, wherein a remote desktop agent is installed on each of the plurality of source computers.

11. The system of claim 10, wherein the remote desktop agent provides encryption.

12. The system of claim 1, wherein communication between the control computer and the plurality of video signal sources is encrypted.

13. The system of claim 1, wherein the video processor is operable to show a plurality of windows associated with the plurality of video signal sources on the display system.

14. The system of claim 13, wherein the video processor is operable to show a plurality of windows associated with the plurality of video signal sources on the control computer.

15. The system of claim 14, wherein the control computer sends input device signals to the video processor to manipulate user controls of the video processor.

16. The system of claim 15, wherein the control computer sends input device signals to the video processor to manipulate user controls of the video processor to add, move delete, and resize windows corresponding to video data from each of the plurality of video signal sources.

17. The system of claim 13, wherein the control computer sends input device signals to each of the plurality of video signal sources to control user applications on the plurality of video signal sources.

18. The system of claim 17, wherein the control computer sends input device signals to each of the plurality of video signal sources to control the computer hardware and operating system.

19. The system of claim 1, wherein the video processor is a switcher that selects input sources without other processing.

20. The system of claim 1, where the video signal sources include cameras and recorders.

21. A method, comprising:
receiving video input from a plurality of video signal sources over a network transmitted over dedicated lines, wherein the plurality of video signal sources include a pan-tilt-zoom camera;
receiving input device signals from a control computer through the network;
associating control of the plurality of video signal sources with input device signals from the control computer, wherein video input from the plurality of video signal sources is synchronized with input device signals from the control computer provided over the network, wherein the network is a control network;
associating control of a video processor with input device signals from the control computer;
processing video input from the plurality of video signal sources at a video processor;
sending processed video data to a display system.

22. The method of claim 21, wherein the video processor is included in the control computer.

23. An apparatus, comprising:
means for receiving video input from a plurality of video signal sources connected to the plurality of video signal sources through a network transmitted over dedicated lines, wherein the plurality of video signal sources include a pan-tilt-zoom camera;
means for receiving input device signals from a control computer through the network;
means for associating control of the plurality of video signal sources with input device signals from the control computer, wherein video input from the plurality of video signal sources is synchronized with input device signals from the control computer provided over the network, wherein the network is a control network;
means for associating control of a video processor with input device signals from the control computer;
means for processing video input from the plurality of video signal sources at a video processor;
means for sending processed video data to a display system.

24. The method of claim 23, wherein the video processor is included in the control computer.

* * * * *